(12) United States Patent
Ahn

(10) Patent No.: US 9,806,370 B2
(45) Date of Patent: Oct. 31, 2017

(54) SECONDARY BATTERY HAVING A PLANARIZING MEMBER

(75) Inventor: Chang-Bum Ahn, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 40 days.

(21) Appl. No.: 13/466,962

(22) Filed: May 8, 2012

(65) Prior Publication Data

US 2013/0045405 A1 Feb. 21, 2013

Related U.S. Application Data

(60) Provisional application No. 61/525,121, filed on Aug. 18, 2011.

(51) Int. Cl.
*H01M 4/64* (2006.01)
*H01M 4/00* (2006.01)
(Continued)

(52) U.S. Cl.
CPC ..... *H01M 10/0431* (2013.01); *H01M 2/1673* (2013.01); *H01M 2/18* (2013.01);
(Continued)

(58) Field of Classification Search
CPC ........ H01M 2/1653; H01M 2/16; H01M 2/14; H01M 10/0587; H01M 10/0431;
(Continued)

(56) References Cited

U.S. PATENT DOCUMENTS

| 3,373,060 A | 3/1968 | Gray |
| 7,927,746 B2 * | 4/2011 | Miller et al. ................. 429/246 |

(Continued)

FOREIGN PATENT DOCUMENTS

| JP | S61-034857 | 2/1986 |
| JP | 2000-188115 | 7/2000 |

(Continued)

OTHER PUBLICATIONS

Machine Translation of Applicant Disclosed KR 10-20060059690.*
(Continued)

*Primary Examiner* — Jonathan G Leong
*Assistant Examiner* — Seenam Agbetiafan
(74) *Attorney, Agent, or Firm* — Knobbe Martens Olson & Bear LLP

(57) ABSTRACT

The secondary battery includes an electrode assembly including a first electrode plate and a second electrode plate whereon first and second electrode active materials, and first and second electrode tabs are formed, respectively, and including a separator disposed between the first and second electrode plates while overlapping with the first and second electrode plates; and a planarizing member disposed on at least one of first and second ends that are opposite to each other in a longitudinal direction of the electrode assembly, wherein the planarizing member covers a stepped surface exposed on the at least one of the first and second ends so as to planarize the stepped surface. In the secondary battery, the stepped surface of an end of the electrode assembly is planarized.

14 Claims, 12 Drawing Sheets

(51) Int. Cl.
  *H01M 10/04* (2006.01)
  *H01M 2/16* (2006.01)
  *H01M 2/18* (2006.01)
  *H01M 10/42* (2006.01)

(52) U.S. Cl.
  CPC ... *H01M 10/0468* (2013.01); *H01M 10/4235* (2013.01); *H01M 10/049* (2013.01)

(58) Field of Classification Search
  CPC ........ H01M 10/4235; H01M 10/0468; H01M 10/049; H01M 2/1673; H01M 2/18
  USPC .......................................... 429/94, 135, 131
  See application file for complete search history.

(56) References Cited

U.S. PATENT DOCUMENTS

| | | | |
|---|---|---|---|
| 8,691,418 B2* | 4/2014 | Haasl ............... | B29C 45/14336 429/130 |
| 2004/0161662 A1* | 8/2004 | Kim et al. ...................... | 429/94 |
| 2005/0123824 A1 | 6/2005 | Ishikawa et al. | |
| 2005/0277018 A1* | 12/2005 | Kim .............................. | 429/120 |
| 2006/0093922 A1* | 5/2006 | Kim et al. .................... | 429/251 |
| 2007/0072072 A1 | 3/2007 | Maeda | |
| 2009/0111011 A1* | 4/2009 | Kim et al. .................... | 429/133 |
| 2009/0191450 A1* | 7/2009 | Kim .............................. | 429/97 |
| 2009/0317701 A1* | 12/2009 | Cha et al. ...................... | 429/94 |
| 2010/0136394 A1* | 6/2010 | Miyahisa .......... | H01M 10/0431 429/94 |
| 2010/0310911 A1* | 12/2010 | Yamamoto et al. ............ | 429/94 |

FOREIGN PATENT DOCUMENTS

| | | |
|---|---|---|
| KR | 10-20060059690 | 6/2006 |
| KR | 10-20070081547 | 8/2007 |
| KR | 10-20110007785 | 1/2011 |

OTHER PUBLICATIONS

Extended European Search Report dated Dec. 3, 2013 for corresponding EP Application No. 12 167 997.1.
Office Action issued on Aug. 5, 2015 for Chinese Patent Application No. 201210291351.3.
Office Action issued on Mar. 24, 2016 for Chinese Patent Application No. 201210291351.3.
Japanese Office Action received in corresponding Japanese Patent Application No. 2012-166804 issued on Jun. 13, 2016 in 4 pages.
Office Action dated Sep. 26, 2016 for Chinese Patent Application No. 201210291351.3, 10 pages.
Office Action dated Mar. 13, 2017 for Chinese Patent Application No. 201210291351.3.

* cited by examiner

ABSTRACT# SECONDARY BATTERY HAVING A PLANARIZING MEMBER

CROSS-REFERENCE TO RELATED APPLICATIONS

This application claims the benefit of U.S. Provisional Patent Application No. 61/525,121 filed Aug. 18, 2011, which is hereby incorporated by reference in its entirety.

BACKGROUND OF THE INVENTION

Field of the Invention

One or more embodiments of the present invention relate to a chargeable and dischargeable secondary battery.

Description of the Related Art

There is an increasing demand for using a secondary battery as an energy source due to technology development and an increase in the manufacture of mobile devices such as mobile phones, notebooks, and the like. Further, secondary batteries are studied and developed to be used in electric vehicles and hybrid vehicles as a replacement of fossil fuel.

The typical secondary battery includes an electrode assembly as a power generating element. However, due to a stepped surface of the electrode assembly, damage such as a dropout of an electrode active material, a scratch or a breakage on an inner sheet of the electrode assembly, or the like may occur. This can result in the charging and discharging efficiency of the secondary battery deteriorating, and an internal short between positive and negative electrodes may occur.

SUMMARY OF THE INVENTION

One or more embodiments of the present invention include a secondary battery in which a stepped surface of an end of an electrode assembly is smoothed or even planarized, whereby inner damage of the electrode assembly due to the stepped surface may be inhibited, and an internal short between positive and negative electrodes may also be inhibited.

According to one or more embodiments of the present invention, a secondary battery includes an electrode assembly including a first electrode plate and a second electrode plate whereon first and second electrode active materials are formed, and first and second electrode tabs are formed, respectively, and including a separator disposed between the first electrode plate and the second electrode plate while overlapping with the first electrode plate and the second electrode plate; and at least one planarizing member disposed on at least one of first and second ends that are opposite to each other in a longitudinal direction of the electrode assembly, wherein the at least one planarizing member has a surface that receives a stepped surface exposed on the at least one of the first and second ends between the two electrode plates so as to cover and planarize the stepped surface.

The planarizing member may include accepting parts for accepting one or more stepped forms among stepped forms of edges of the first and second electrode active materials, the first and second electrode tabs, edges of the first and second electrode plates, and an edge of the separator.

The planarizing member may include a stepped form or indentation that is complementary with the stepped surface exposed on the at least one of the first and second ends of the electrode assembly.

The planarizing member may include a coating layer including two or more layers that are stacked on a sheet base and that are stepped.

The planarizing member may be formed of an insulating resin-based material that is coated and cured on the at least one of the first and second ends of the electrode assembly.

The planarizing member may cover at least one of edges of the first and second electrode active materials, the first and second electrode tabs, edges of the first and second electrode plates, and an edge of the separator.

The first and second electrode tabs may be formed together on the first end of the electrode assembly, and the planarizing member may extend to cover both the first and second electrode tabs.

An edge of the first electrode plate that extends further than the first electrode tab, and an edge of the separator that extends further than the edge of the first electrode plate may be formed between the first and second electrode tabs, and the planarizing member may extend to seamlessly cover all of the first and second electrode tabs, the edge of the first electrode plate, and the edge of the separator.

On the first end of the electrode assembly, a length of the separator may be greater than a length of the first electrode plate and may be less than a length of the second electrode plate.

The planarizing member may extend while crossing the first electrode tab, thereby covering an edge of the first electrode active material.

The first and second electrode tabs may be formed on the first and second ends of the electrode assembly, respectively.

The electrode assembly may be rolled in a shape of a roll by using the first end as a roll start and by using the second end as a roll end, and the planarizing member may be formed on the first end.

The planarizing member may include first and second planarizing members formed on the first end and the second end, respectively.

The planarizing member may cover the first electrode tab.

The planarizing member may extend to seamlessly cover both the first electrode tab and an edge of the first electrode active material.

The planarizing member may extend to seamlessly cover an edge of the first electrode plate that extends while crossing the first electrode tab.

The planarizing member may extend to seamlessly cover an edge of the separator that extends further than the edge of the first electrode plate.

The planarizing member may cover the second electrode tab.

The second electrode tab may be formed on the second electrode plate that extends further than the first electrode plate, and the planarizing member may extend to cover both the second electrode tab and an edge of the first electrode plate.

The planarizing member may extend to cover an edge of the first electrode active material on the first electrode plate.

The planarizing member may extend to cover all of the second electrode tab, the edge of the first electrode plate, and an edge of the separator that is formed between the second electrode tab and the edge of the first electrode plate.

A secondary battery according to one or more embodiments of the present invention provides a planarized surface by covering a stepped surface exposed on an end of an electrode assembly, so that, when the electrode assembly is rolled, it is possible to inhibit an inner damage or an inner short, which is caused by the fact that the electrode assembly faces the stepped edge. Also, despite inner pressure that is caused by thermal expansion during repetitive charging and discharging of the electrode assembly, or pressure that is generated when a separator and an electrode plate are adhered or when the electrode assembly is pressed, it is possible to inhibit a damage and an inner short in the electrode assembly.

BRIEF DESCRIPTION OF THE DRAWINGS

These and/or other aspects will become apparent and more readily appreciated from the following description of the embodiments, taken in conjunction with the accompanying drawings of which.

DESCRIPTION OF EMBODIMENT

Reference will now be made in detail to embodiments, examples of which are illustrated in the accompanying drawings.

Figure 1:
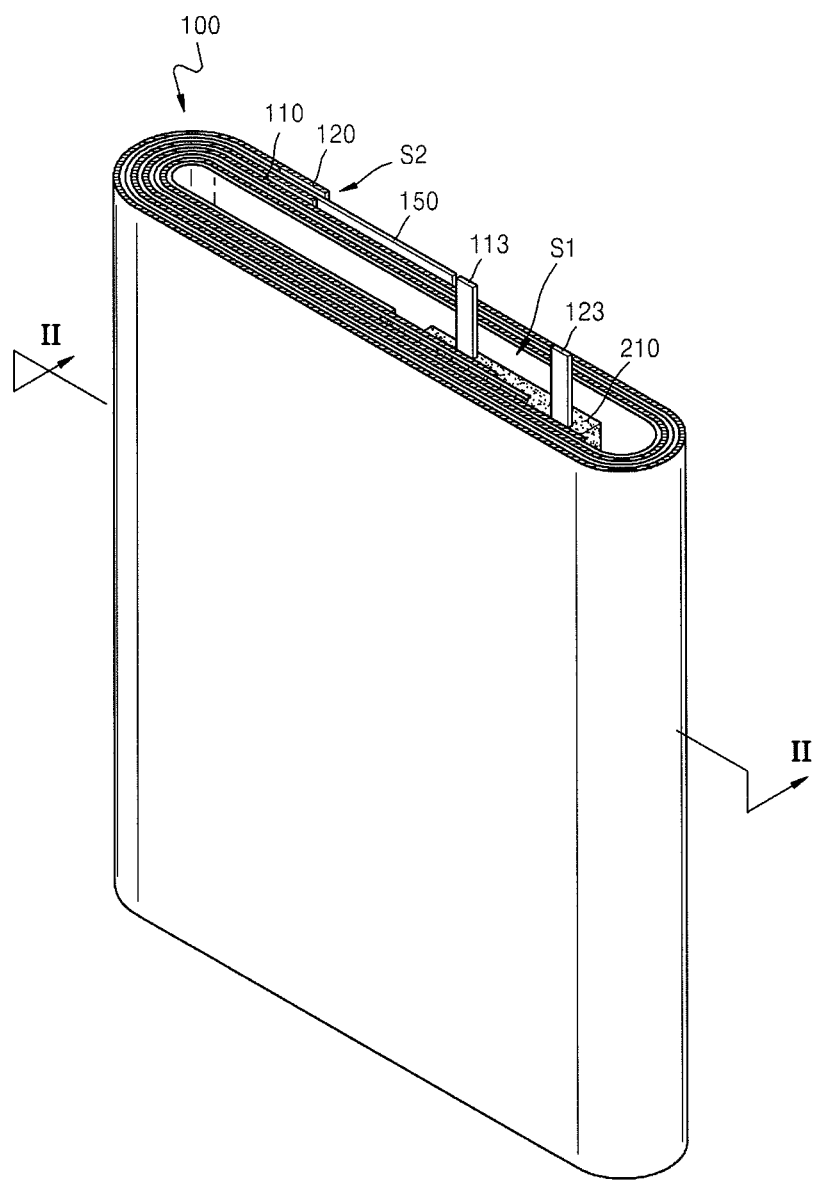
FIG. 1 is a perspective view of a secondary battery according to an embodiment of the present invention.
Figure 2:
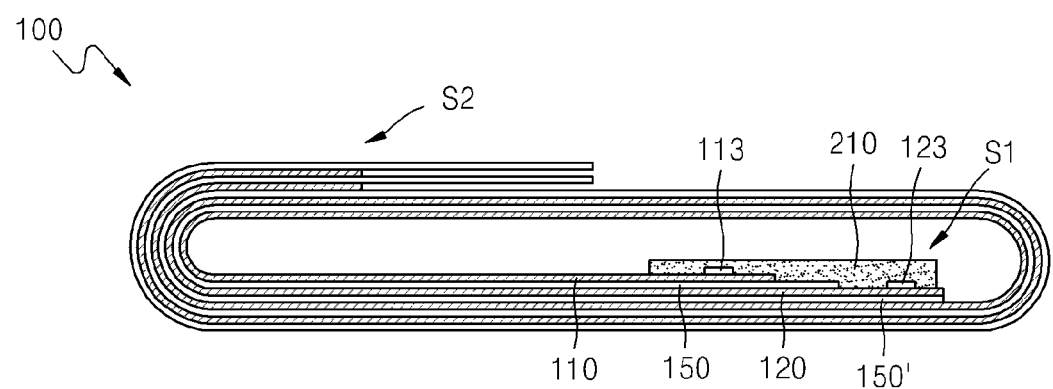
FIG. 2 is a cross-sectional view of the secondary battery, taken along a line II-II of FIG. 1.

FIG. 1 is a perspective view of a secondary battery according to an embodiment of the present invention. FIG. 2 is a cross-sectional view of the secondary battery, taken along a line II-II of FIG. 1.

Referring to FIGS. 1 and 2, the secondary battery includes an electrode assembly 100, and a planarizing member 210 that is formed on at least one of first and second ends S1 and S2 in a roll direction of the electrode assembly 100.

The electrode assembly 100 may be formed in a manner that first and second electrode plates 110 and 120 on which an electrode active material is coated are separated while having a separator 150 interposed therebetween, an additional separator 150' is also added to insulate the first and second electrode plates 110, 120 and then the first and second electrode plates 110 and 120, and the separators 150 are rolled together in the shape of a jelly roll. For example, the electrode assembly 100 may be formed in the shape of the jelly roll in a manner that the first end S1 of the electrode assembly 100 is a start of the roll, and the second end S2 of the electrode assembly 100 is an end of the roll.

The electrode assembly 100 including the first and second electrode plates 110 and 120, and the separator 150 between the first and second electrode plates 110 and 120 may surround a roll center and may extend in the shape of the jelly roll from an inner direction toward an outer direction, the first end S1 may be formed at the roll center or may be adjacent to the roll center, and the second end S2 may form a part of a periphery of the electrode assembly 100 and may form an outermost portion.

For example, the electrode assembly 100 formed in the shape of the roll may have a cylindrical shape, or when required, the electrode assembly 100 may have an oval cross-section shape formed by being pressed through a press forming process.

First and second electrode tabs 113 and 123 are formed on the first and second electrode plates 110 and 120 so as to output charges formed by a chemical reaction to an external circuit, and to form a path of charging and discharging currents.

The first and second electrode plates 110 and 120 are disposed to overlap with each other while having the separator 150 disposed therebetween, and in this regard, according to the roll direction, the second electrode plate 120 disposed outside the separator 150 may form an outermost turn, and the first electrode plate 110 disposed inside the separator 150 may be disposed at an inner side of the second electrode plate 120.

For example, if an electrode of an outermost part is selected to a negative electrode, and an electrode inside the outermost part is selected to be a positive electrode, the first and second electrode plates 110 and 120 may be formed as a positive electrode plate and a negative electrode plate, respectively. However, the separator 150 that extends while having a sufficient length may surround the second electrode plate 120 and then may form the outermost turn.

Figure 3:
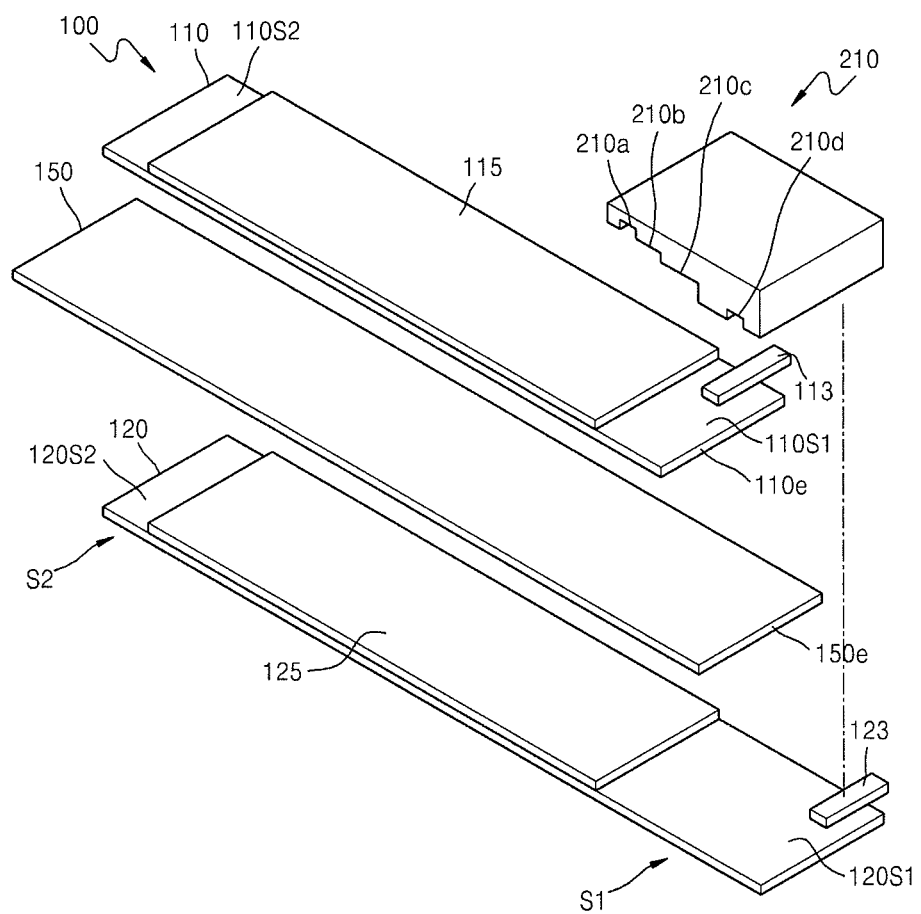
FIG. 3 is a development diagram illustrating the secondary battery of FIG. 1.
Figure 4:
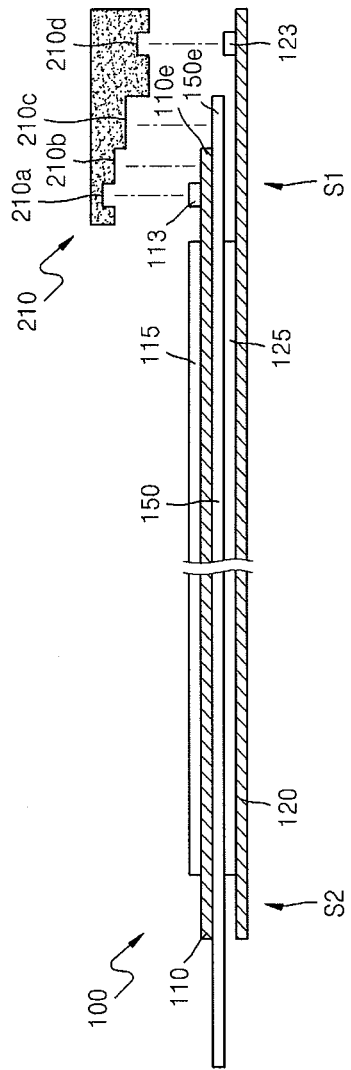
FIG. 4 is a cross-sectional view of the secondary battery of FIG. 3.

FIG. 3 is a development diagram illustrating the secondary battery of FIG. 1. FIG. 4 is a cross-sectional view of the secondary battery of FIG. 3.

Referring to FIG. 3, in the electrode assembly 100, the first and second electrode plates 110 and 120 that extend in the form of a sheet along a single direction are stacked to face each other while having the separator 150 interposed therebetween.

The first electrode plate 110 functions to provide a transfer path of charges generated in a first electrode active material 115 and to support the first electrode active material 115. For example, the first electrode plate 110 may function as a positive electrode and may include aluminum or an aluminum alloy.

The first electrode active material 115 may be formed on at least one surface of the first electrode plate 110. The first electrode active material 115 may be formed in a manner that an electrode mixture formed of an electrode active material, a binder, and a conducting agent is dispersed in a solvent so as to have a slurry form, and then this is coated on at least one surface of the first electrode plate 110, is dried and then is pressed.

An uncoated portion on which the first electrode active material 115 is not formed may be formed on the first electrode plate 110. For example, the uncoated portion on which the first electrode active material 115 is not formed may be formed at one of longitudinal first and second ends 110S1 and 110S2 of the first electrode plate 110. In the secondary battery of FIG. 3, the uncoated portions are formed at the first and second ends 110S1 and 110S2 of the first electrode plate 110.

The first electrode tab 113 for externally outputting charges generated due to a chemical reaction is formed on the uncoated portion. For example, the first electrode tab 113 may be formed on the uncoated portion of the first end 110S1 and may be coupled with the uncoated portion of the first end 110S1 by ultrasonic-welding. The first electrode tab 113 may function as a positive tab and may include aluminum or an aluminum alloy.

The second electrode plate 120 may function to provide a transfer path of charges generated in a second electrode active material 125 and to support the second electrode active material 125. For example, the second electrode plate 120 may function as a negative electrode and may include copper or a copper alloy.

The second electrode active material 125 may be formed on at least one surface of the second electrode plate 120. The second electrode active material 125 may be formed in a manner that an electrode mixture formed of an electrode active material, a binder, and a conducting agent is dispersed in a solvent so as to have a slurry form, and then this is coated on one surface of the second electrode plate 120, is dried and then is pressed.

An uncoated portion on which the second electrode active material 125 is not formed may be formed on the second electrode plate 120. For example, the uncoated portion on which the second electrode active material 125 is not formed may be formed at one of longitudinal first and second ends 120S1 and 120S2 of the second electrode plate 120. In the secondary battery of FIG. 3, the uncoated portions are formed at the first and second ends 120S1 and 120S2 of the second electrode plate 120.

The second electrode tab 123 for externally outputting charges generated due to a chemical reaction is formed on the uncoated portion. For example, the second electrode tab 123 may be formed on the uncoated portion of the first end 120S1 and may be coupled with the uncoated portion of the first end 120S1 by ultrasonic-welding. The second electrode tab 123 may function as a positive tab and may include nickel or a nickel alloy.

For example, the first and second electrode tabs 113 and 123 are formed at the first end S1 of the electrode assembly 100, and as will be described later, by using the planarizing member 210 that covers both the first and second electrode tabs 113 and 123 that are adjacent to each other, a stepped form of the first and second electrode tabs 113 and 123 is planarized so that, when the electrode assembly 100 is rolled, it is possible to avoid a concentrated press applied on a side that faces the stepped form of the first and second electrode tabs 113 and 123. This will be descried in detail at a later time.

The first and second electrode plates 110 and 120 are stacked to face each other while having the separator 150 interposed therebetween, and the separator 150 between the first and second electrode plates 110 and 120 prevents a short between positive and negative electrodes. The separator 150 may be formed of a porous film having high ion permeability and a high mechanical strength, in more detail, the separator 150 may be formed of olefin-based polymer including polyethylene, polypropylene, and the like.

The separator 150 may extend while having a sufficient length between the first and second electrode plates 110 and 120, so that the separator 150 may prevent an internal short between the first and second electrode plates 110 and 120 due to thermal contraction. For example, the separator 150 may extend further than at least one of the first and second electrode plates 110 and 120.

The secondary battery may further include an electrolyte (not shown) impregnated in the electrode assembly 100. The electrolyte and the electrode assembly 100 may be contained together in a battery case (not shown) so that the electrolyte may be impregnated in the electrode assembly 100. For example, the electrolyte may include a non-aqueous electrolyte.

Referring to FIGS. 3 and 4, the planarizing member 210 is formed on the first end S1 of the electrode assembly 100. The planarizing member 210 may be formed to cover the stepped surface between the first and second electrode tabs 113 and 123 by including the first and second electrode tabs 113 and 123. The planarizing member 210 has openings that accept the stepped form or protrusion formed by the first and second electrode tabs 113 and 123, that is, the planarizing member 210 accepts the stepped form or protrusion formed by the first and second electrode tabs 113 and 123 that significantly project from the first and second electrode plates 110 and 120 in a thickness direction. The planarizing member 210 accepts the stepped form or protrusion formed by the first and second electrode tabs 113 and 123, covers the first and second electrode tabs 113 and 123 so as to planarize the stepped form or protrusion, and prevents the stepped form or protrusion from being exposed via a surface of the planarizing member 210, so that the planarizing member 210 forms a substantially flat surface. It will be appreciated that the planarizing member 210 can, but does not necessarily have to, be planar. The member 210 can have curves or protrusions but is intended to reduce the amount of sharp protrusions that can damage the electrodes 110, 120 and the separator 150.

Here, in this embodiment, the flat surface includes a completely flat surface along the surface of the planarizing member 210, and includes a surface whose stepped form is planarized, i.e., the flat surface includes the surface that is planarized to remove its sharp stepped form.

The planarizing member 210 is formed to cover both the first and second electrode tabs 113 and 123. The first and second electrode tabs 113 and 123 are formed of a hard metal material that is less flexible, so that the first and second electrode tabs 113 and 123 may cause a concentrated pressure due to their corners and thus may cause damage to the inner surfaces of the electrode plates or separator. Also, the first and second electrode tabs 113 and 123 may have a sufficient thickness equal to or greater than 0.1 mm, in consideration of an electrical resistance, so that the stepped surface thereof may be planarized by using the planarizing member 210 that accepts and covers the first and second electrode tabs 113 and 123.

The planarizing member 210 may extend to have a sufficient length so as to cover both the first and second electrode tabs 113 and 123, and may cover the stepped form or protrusion formed between the first and second electrode tabs 113 and 123 in a longitudinal direction of the electrode assembly 100.

In the embodiment, an edge 110e of the first electrode plate 110, and an edge 150e of the separator 150 may be exposed between the first and second electrode tabs 113 and 123, and the edges 110e and 150e form the stepped surface with the first and second electrode tabs 113 and 123. The planarizing member 210 that is formed to cover both the first and second electrode tabs 113 and 123 covers the stepped surface between the first and second electrode tabs 113 and 123 by including the edges 110e and 150e of the first electrode plate 110 and the separator 150, so that the stepped surface is not externally exposed, and a planarized surface is provided via a surface of the planarizing member 210.

On the first end S1 of the electrode assembly 100, a length of the separator 150 may be greater than a length of the first electrode plate 110 and may be less than a length of the second electrode plate 120. Since the separator 150 extends further than the first electrode plate 110, a short between the first and second electrode plates 110 and 120 may be prevented, despite thermal contraction of the separator 150.

The separator 150 may end while forming the edge 150e between the first and second electrode tabs 113 and 123, and in this regard, since the length of the separator 150 is short enough to expose the second electrode tab 123 disposed below the separator 150, the first and second electrode tabs 113 and 123 may be covered by the planarizing member 210.

When the electrode assembly 100 is rolled by using the first end S1 as a roll start so that the first end S1 becomes a roll center or is adjacent to a roll center, or when the electrode assembly 100 is rolled by using the first end S1 as a roll end so that the first end S1 is formed on a periphery of the electrode assembly 100, if the stepped surface on the first end S1 of the electrode assembly 100 is exposed without being covered, a concentrated pressure is applied on an opposite surface facing the stepped surface of the first end S1, such that a physical damage may occur in the first and second electrode plates 110 and 120, and the separator 150. This may result in a scratch or a breakage. Also, a short between positive and negative electrodes may occur due to an active material that has passed through the damaged separator 150 or that has dislodged from the first and second electrode plates 110 and 120.

In addition, the electrode assembly 100 that is rolled in the shape of the jelly roll may be pressed, when required. During this pressure operation, the first end S1 of the electrode assembly 100 may cause the concentrated press with respect to the opposite surface facing the first end S1. Also, as the secondary battery is repeatedly charged and discharged, the electrode assembly 100 may expand, but due to the battery case, the expansion of the electrode assembly 100 is restrained such that a pressure toward the roll center may be generated inside the electrode assembly 100, and here, the stepped surface of the electrode assembly 100 may cause the damage of the first and second electrode plates 110 and 120, and the separator 150 or may cause the short between positive and negative electrodes.

In particular, according to the technology in which the separator 150 and the first and second electrode plates 110 and 120, which are formed by coating a polymer binder having excellent adhesion, are bonded by being pressed at a high temperature, the electrode assembly 100 formed by rolling the separator 150 and the first and second electrode plates 110 and 12 is pressed at a high temperature, such that the damage of the first and second electrode plates 110 and 120, and the separator 150 may be incurred due to the stepped surface or protrusion.

When the electrode assembly 100 is rolled, the planarizing member 210 may overlap and contact with another portion of the electrode assembly 100 in the electrode assembly 100 having a roll shape. Here, the flat surface of the planarizing member 210 may form a contact interface without a step with the other portion, and then pressure may be uniformly applied to the other portion, so that a physical damage of the electrode assembly 100 due to a concentrated press applied on a particular portion may be inhibited, and the short between positive and negative electrodes due to non-insulation may be blocked.

The planarizing member 210 may have the flat surface, and its inner surface may be leveled to be complementary with the stepped surface of the electrode assembly 100. For example, the planarizing member 210 may have a stepped form and may have accepting parts or openings 210a, 210b, 210c, and 210d that accept the first electrode tab 113, the edge 110e of the first electrode plate 110, the edge 150e of the separator 150, and the second electrode tab 123, respectively, in a disposed order along a longitudinal direction of the electrode assembly 100. That is, the inner surface of the planarizing member 210 may have the first electrode tab accepting part 210a, the first electrode plate edge accepting part 210b, the separator edge accepting part 210c, and the second electrode tab accepting part 210d.

The planarizing member 210 is formed of an insulating material, thereby inhibiting short circuits between positive and negative electrodes between the first and second electrode tabs 113 and 123 and the first and second electrode plates 110 and 120. That is, the planarizing member 210 covers the first and second electrode tabs 113 and 123 so that, when the electrode assembly 100 is rolled, the planarizing member 210 may inhibit the internal short caused by the fact that the first and second electrode tabs 113 and 123 having opposite polarities, and the first and second electrode plates 110 and 120 having opposite polarities overlap with each other.

On the first end S1 of the electrode assembly 100, the length of the separator 150 may be greater than the first electrode plate 110 and may be less than the second electrode plate 120. Since the separator 150 extends further than the first electrode plate 110, the short between the first and second electrode plates 110 and 120 may be inhibited, despite thermal contraction of the separator 150, and since the separator 150 exposes the second electrode tab 123 below the separator 150, the second electrode tab 123 may be covered by the planarizing member 210.

On the second end S2 of the electrode assembly 100, the separator 150 may extend further than the first and second electrode plates 110 and 120, thereby inhibiting a short between the first and second electrode plates 110 and 120 due to thermal contraction of the separator 150. On the first end S1, a position of the separator 150 may be limited by the planarizing member 210, but on the second end S2 without limitation, the separator 150 may extend further than the first and second electrode plates 110 and 120 so as to prepare against thermal contraction of the separator 150. For example, when the electrode assembly 100 is rolled by using the first end S1 of the electrode assembly 100 as a roll start, a portion of the separator 150 which extends further than the first and second electrode plates 110 and 120 on the second end S2 may be formed to surround the periphery of the electrode assembly 100.

The planarizing member 210 may improve stability with respect to burrs formed on edges of the first and second electrode plates 110 and 120, e.g., a burr formed on the edge 110e of the first electrode plate 110. The first and second electrode plates 110 and 120 may be individualized by cutting sequential sheets into the first and second electrode plates 110 and 120 via a roll-to-roll process, and the burrs due to the cutting may be formed on the edges of the first and second electrode plates 110 and 120. The planarizing member 210 may have a sufficient thickness so as to cover the edges of the first and second electrode plates 110 and 120, e.g., the burr on the edge 110e of the first electrode plate 110, or to exceed projection of the burrs, so that the planarizing member 210 may prevent contact between the burrs and other inner sheets (e.g., the first and second electrode plates 110 and 120, and the separator 150).

Also, the planarizing member 210 may cover the first and second electrode tabs 113 and 123, thereby improving stability with respect to burrs formed on corners of the first and second electrode tabs 113 and 123. When the electrode assembly 100 is rolled, the burrs that project on the first and second electrode tabs 113 and 123 may damage an inner sheet of the electrode assembly 100 which faces the burrs, but due to the planarizing member 210, the damage may be prevented.

Figure 5:
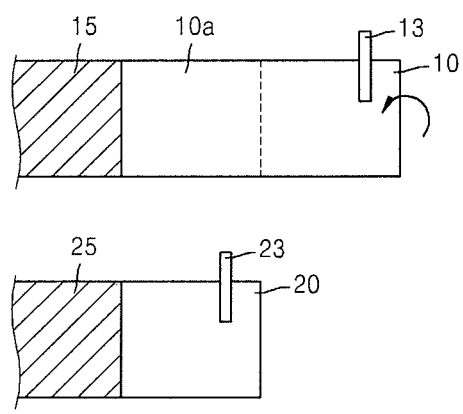
FIG. 5 is a diagram illustrating a process of rolling an electrode assembly according to a comparative example.

FIG. 5 is a diagram schematically illustrating a process of rolling an electrode assembly according to a comparative example. Referring to FIG. 5, electrode active materials 15 and 25 are formed on first and second electrode plates 10 and 20, and uncoated portions on which the electrode active materials 15 and 25 are not formed are formed on ends of the first and second electrode plates 10 and 20. Afterward, first and second electrode tabs 13 and 23 are formed on the uncoated portions of the first and second electrode plates 10 and 20. The first and second electrode plates 10 and 20 are rolled while having a separator (not shown) interposed therebetween. For example, the first and second electrode plates 10 and 20 may be rolled by using the ends whereon the first and second electrode tabs 13 and 23 are formed as a roll start. In an early stage of the roll operation, the first electrode plate 10 is solely turned once, and after the first electrode plate 10 is solely turned once so as to overlap on its uncoated portion 10a, the first electrode plate 10 may overlap with the second electrode plate 20 and then may be rolled together. For example, the first electrode plate 10 is turned once with respect to a dotted line of FIG. 5 so that the first electrode tab 13 overlaps on the uncoated portion 10a, and thus a step or a burr of the first electrode tab 13 is covered by the uncoated portion 10a. By doing so, inner damage in the electrode assembly may be prevented.

The uncoated portion 10a relatively further extends on the first electrode plate 10 so as to have a sufficient length to surround the first electrode tab 13 by being turned once. However, if the uncoated portion 10a on which the electrode active material 15 is not formed further extends, a length of the electrode active material 15 for generation of charges is decreased so that charging and discharging efficiency of the battery deteriorates.

According to the embodiment of FIG. 4, the planarizing member 210 is formed to cover the first and second electrode tabs 113 and 123, so that an initial single turn to surround the first and second electrode tabs 113 and 123 is not necessary. Accordingly, in the embodiment of FIG. 4, a length of uncoated portions may be decreased, and a length of the first and second electrode active materials 115 and 125 may be relatively increased, so that a charging and discharging efficiency may be increased. The length of the uncoated portions is sufficient only if the length of the uncoated portions is appropriate for combination with the first and second electrode tabs 113 and 123, and for example, the first and second electrode active materials 115 and 125 may be formed to positions adjacent to the first and second electrode tabs 113 and 123.

The planarizing member 210 may extend to cover all of the first electrode tab 113, the edge 110e of the first electrode plate 110, the edge 150e of the separator 150, and the second electrode tab 123 that form the stepped surface. However, when required, the first electrode tab 113, the edge 110e of the first electrode plate 110, the edge 150e of the separator 150, and the second electrode tab 123 that form the stepped surface of the first end S1 may be individually covered by the planarizing member 210, or may form different combinations and then may be covered by the planarizing member 210. The planarizing member 210 may have a seamlessly extending shape or two or more separated members so as to cover a selected part or the entire stepped surface.

The planarizing member 210 is formed to have one of various embodiments so as to cover the selected part or the entire stepped surface, and this is because necessity of planarization may differ according to positions on the stepped surface. If the planarizing member 210 decreases the inner damage by removing the stepped surface, the planarizing member 210 may be formed to cover a particular area of the stepped surface or to completely cover the stepped surface.

Figure 6:
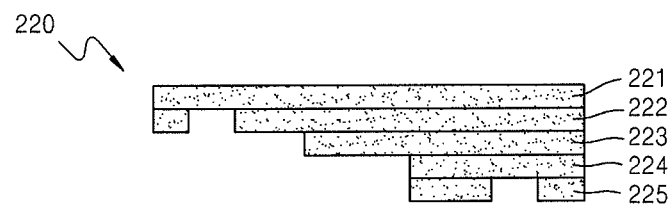
FIGS. 6 through 8 illustrate planarizing members, according to embodiments of the present invention.

FIG. 6 illustrates a planarizing member 220, according to an embodiment of the present invention. As illustrated in FIG. 6, the planarizing member 220 may have a tape form and then may be adhered on the first end S1 of the electrode assembly 100. For example, the planarizing member 220 having the tape form may be leveled to have a stepped surface that is complementary with the first end S1 of the electrode assembly 100.

For example, the planarizing member 220 may include a plurality of coating layers 222, 223, 224, and 225 that are stacked on a sheet base 221 so as to have a stepped form. The sheet base 221 and the plurality of coating layers 222, 223, 224, and 225 may be formed of an insulating material, and for adhesive combination with the stepped surface of the first end S1 of the electrode assembly 100, the coating layers 222, 223, 224, and 225 may be formed of a resin-based material having adhesion, or a separate adhesive may be coated on the coating layers 222, 223, 224, and 225.

When the planarizing member 220 is adhered, a heating member may be used to help adhesion between the planarizing member 220 and the first end S1 of the electrode assembly 100, and the planarizing member 220 may be pressed on the first end S1 of the electrode assembly 100 according to a predetermined press.

For example, the planarizing member 220 may include the first through fourth coating layers 222, 223, 224, and 225 that are formed at different levels, and since the first through fourth coating layers 222, 223, 224, and 225 are formed while having different areas, the first through fourth coating layers 222, 223, 224, and 225 may form the stepped surface that is complementary with the first end S1 of the electrode assembly 100.

Figure 7:
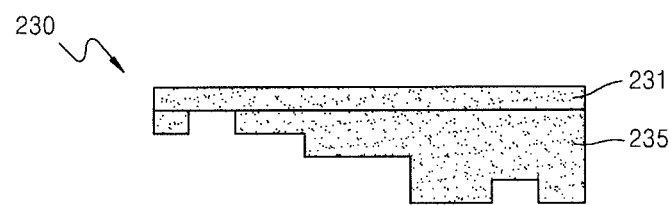

FIG. 7 illustrates a planarizing member 230, according to another embodiment of the present invention. Referring to FIG. 7, the planarizing member 230 may have a tape form and may include a sheet base 231 and a step accepting layer 235 formed on the sheet base 231. The sheet base 231 may be formed of an insulating material, and the step accepting layer 235 may be formed of an insulating resin-based material so as to have sufficient flexibility to accept the stepped surface of the first end S1 of the electrode assembly 100 when the planarizing member 230 is pressed. When the planarizing member 230 is adhered, the step accepting layer 235 may be pressed to the stepped surface of the electrode assembly 100 according to a press applied thereto, and may be flexibly deformed to accept the step on the first end S1. When the planarizing member 230 is adhered, a heating member may be used to help the flexible deformation of the planarizing member 230 and to help the planarizing member 230 to be pressed and adhered on the first end S1.

Figure 8:
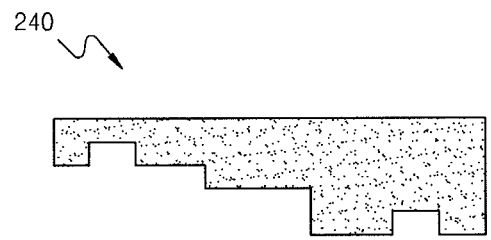

FIG. 8 illustrates a planarizing member 240, according to another embodiment of the present invention. Referring to FIG. 8, the planarizing member 240 may be formed of an insulating resin-based material that is coated and cured on the first end S1 of the electrode assembly 100. For example, the planarizing member 240 in the form of a paste may be coated on the first end S1 of the electrode assembly 100 and then may be fixed on the first end S1 of the electrode assembly 100 via an appropriate curing process. When the planarizing member 240 is coated, the planarizing member 240 may be coated along the stepped surface of the first end S1 and may have a sufficient thickness to cover the stepped surface.

Figure 9:
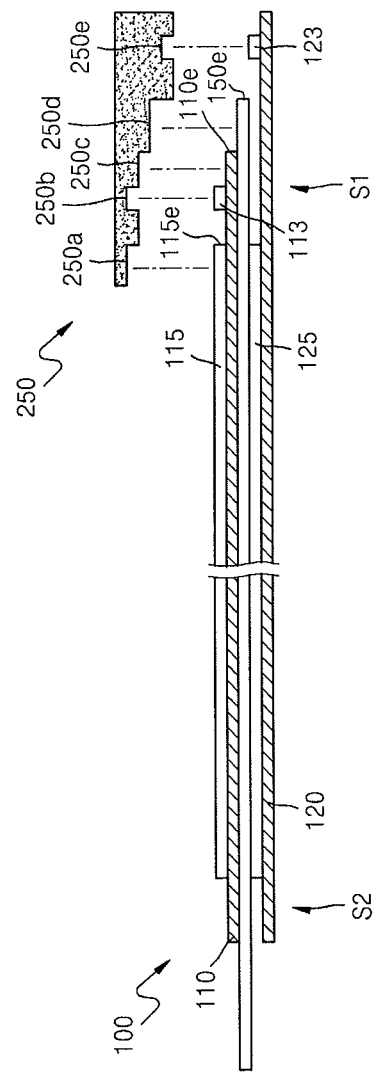
FIG. 9 is a cross-sectional view of a secondary battery according to another embodiment of the present invention.

FIG. 9 is a diagram illustrating a secondary battery according to another embodiment of the present invention. Referring to FIG. 9, a planarizing member 250 that is formed to cover first and second electrode tabs 113 and 123 may extend to cover an edge 115e of a first electrode active material 115. The first electrode active material 115 forms a boundary with an uncoated portion, and a step corresponding to a thickness of the first electrode active material 115 is formed at the edge 115e of the first electrode active material 115. The planarizing member 250 is formed to accept and cover the edge 115e of the first electrode active material 115, so that, when an electrode assembly 100 is rolled, it is possible to prevent inner damage of the electrode assembly 100 which is caused by the fact that the electrode assembly 100 faces the stepped edge 115e of the first electrode active material 115.

In the embodiment of FIG. 9, the planarizing member 250 may cover the first and second electrode tabs 113 and 123 and may extend to a position that is away from the first electrode tab 113, so that the planarizing member 250 may cover the edge 115e of the first electrode active material 115. For example, the planarizing member 250 may cover the first and second electrode tabs 113 and 123, may cover a stepped surface between the first and second electrode tabs 113 and 123, and may cover an edge 110e of a first electrode plate 110 and an edge 150e of a separator 150 between the first and second electrode tabs 113 and 123. Also, the planarizing member 250 may extend to the position that is away from the first electrode tab 113 in a longitudinal direction of the electrode assembly 100, so that the planarizing member 250 may cover the edge 115e of the first electrode active material 115.

In more detail, the planarizing member 250 may have a relatively flat surface and its inner surface may be leveled to be complementary with a stepped surface of the electrode assembly 100. For example, the planarizing member 250 may have a stepped form and may have accepting parts or openings 250a, 250b, 250c, 250d, and 250e that accept the edge 115e of the first electrode active material 115, the first electrode tab 113, the edge 110e of the first electrode plate 110, the edge 150e of the separator 150, and the second electrode tab 123, respectively, in a disposed order along the longitudinal direction of the electrode assembly 100. That is, the inner surface of the planarizing member 250 may have the first electrode active material edge accepting part 250a, the first electrode tab accepting part 250b, the first electrode plate edge accepting part 250c, the separator edge accepting part 250d, and the second electrode tab accepting part 250e.

Figure 10:
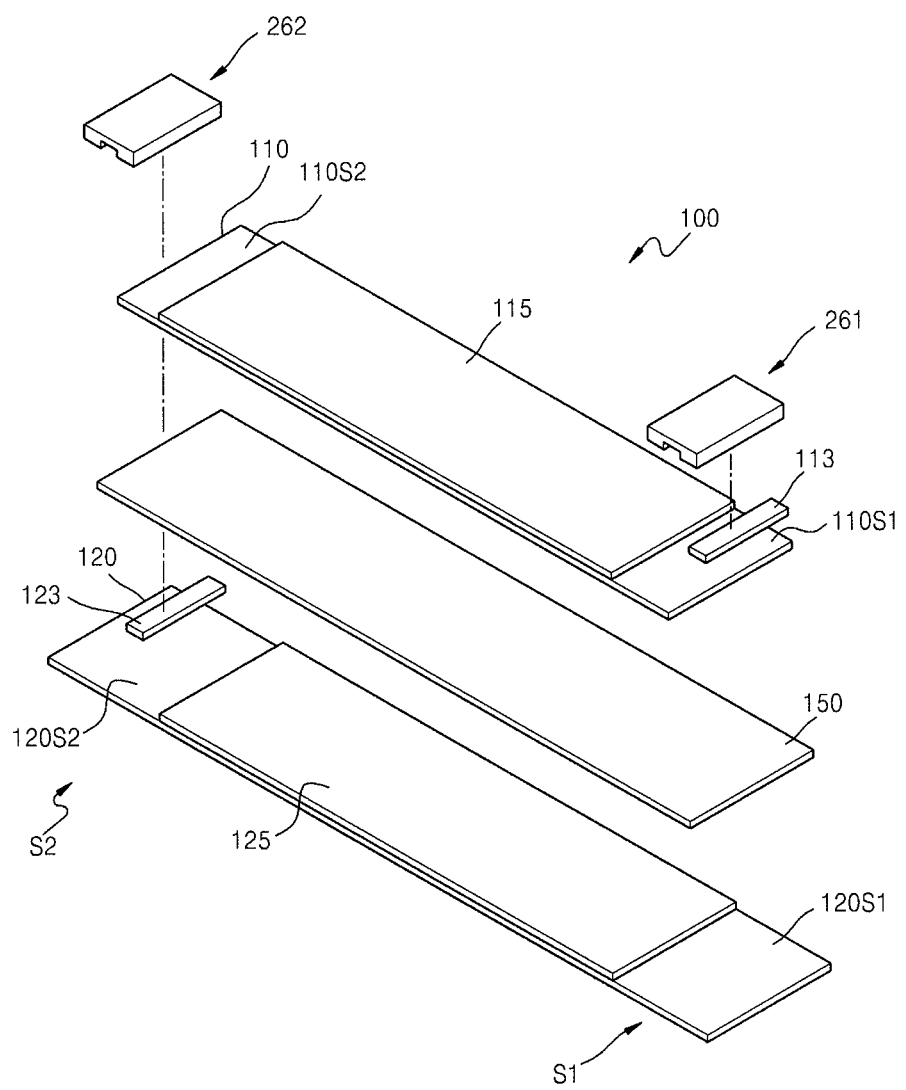
FIG. 10 is a perspective view of a secondary battery according to another embodiment of the present invention.

FIG. 10 is a diagram illustrating a secondary battery according to another embodiment of the present invention. Referring to FIG. 10, first and second electrode plates 110 and 120 are stacked while having a separator 150 interposed therebetween. First and second electrode active materials 115 and 125 may be formed on the first and second electrode plates 110 and 120, and uncoated portions on which the first and second electrode active materials 115 and 125 are not formed may be formed on ends of the first and second electrode plates 110 and 120. Then, first and second electrode tabs 113 and 123 are formed on the uncoated portions of the first and second electrode plates 110 and 120.

The first and second electrode tabs 113 and 123 may be respectively formed on a first end S1 and a second end S2 that are opposite in a longitudinal direction of an electrode assembly 100. For example, the first electrode tab 113 may be formed on a first end 110S1 of the first electrode plate 110, and the second electrode tab 123 may be formed on a second end 120S2 of the second electrode plate 120. For example, the electrode assembly 100 may be rolled by using the first end S1 as a roll start and by using the second end S2 as a roll end, and in the electrode assembly 100 that is completely rolled, the first end S1 may be a roll center or may be disposed to be adjacent to a roll center, and the second end S2 may form an outermost part on a periphery of the electrode assembly 100.

A first planarizing member 261 may be disposed on the first end S1 of the electrode assembly 100. The first planarizing member 261 may be formed to cover the first electrode tab 113 formed on the first end S1, may accept a stepped form or protrusion of the first electrode tab 113 so as not to expose the stepped form of the first electrode tab 113 via its surface, and thus may form a substantially flat surface.

The first end S1 may form the roll start of the electrode assembly 100, and may be the roll center or may be disposed to be adjacent to the roll center in the electrode assembly 100 that is completely rolled. When the electrode assembly 100 is rolled, the first end S1 that is tightly tensioned forms a plurality of contact points with other portions of the electrode assembly 100 in a radial direction from the roll center of the electrode assembly 100, so that inner damage of the electrode assembly 100 may be prevented by the first planarizing member 261 that covers the first end S1.

A second planarizing member 262 may be disposed on the second end S2 of the electrode assembly 100. The second planarizing member 262 may be formed to cover the second electrode tab 123 formed on the second end S2, may accept a stepped form or protrusion of the second electrode tab 123 so as not to expose the stepped form of second electrode tab 123 via its surface, and thus may form a substantially flat surface.

In the embodiment of FIG. 10, the first and second planarizing members 261 and 262 may be formed on the first and second ends S1 and S2 of the electrode assembly 100 so as to cover the first and second electrode tabs 113 and 123. The first and second planarizing members 261 and 262 may be formed to cover the first and second electrode tabs 113 and 123 by accepting them, and may form a flat surface by accepting a stepped form of the first and second electrode tabs 113 and 123. That is, the first and second planarizing members 261 and 262 may include the first planarizing member 261 that covers the first electrode tab 113 by accepting the first electrode tab 113 on the first end S1 of the electrode assembly 100, and may include the second planarizing member 262 that covers the second electrode tab 123 by accepting the second electrode tab 123 on the second end S2 of the electrode assembly 100.

The first and second electrode tabs 113 and 123 may be formed of a relatively hard metal material, so that they may cause inner damage by generating a concentrated press via their corners. Thus, by forming the first and second planarizing members 261 and 262 so as to cover the first and second electrode tabs 113 and 123 that are respectively formed on the first and second ends S1 and S2 of the electrode assembly 100 which are opposite to each other, it is possible to prevent the inner damage of the electrode assembly 100 which is caused by facing the stepped surface.

Figure 11:
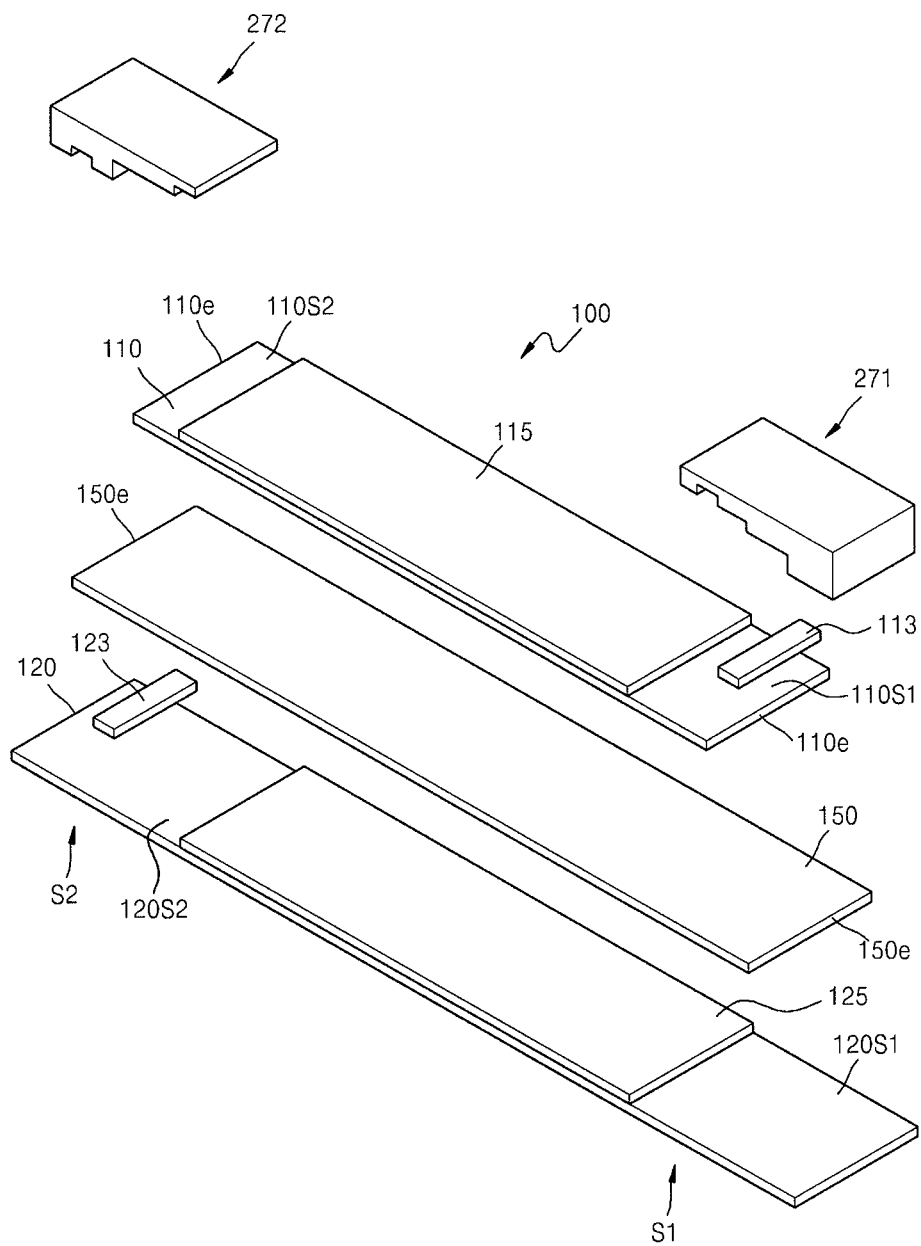
FIG. 11 is a perspective view of a secondary battery according to another embodiment of the present invention.
Figure 12:
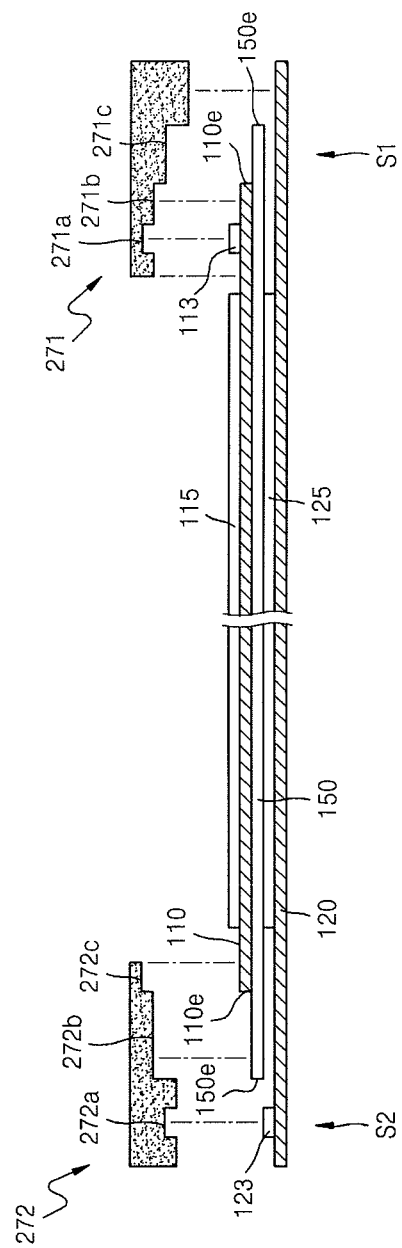
FIG. 12 is a cross-sectional view of the secondary battery of FIG. 11.

FIG. 11 is a perspective view of a secondary battery according to another embodiment of the present invention. FIG. 12 is a cross-sectional view of the secondary battery of FIG. 11. Referring to FIGS. 11 and 12, a first planarizing member 271 is formed on a first end S1 of an electrode assembly 100. The first planarizing member 271 may extend to cover all of a first electrode tab 113, an edge 110e of a first electrode plate 110, and an edge 150e of a separator 150 that form a stepped form. On the first end S1 of the electrode assembly 100, a length of the separator 150 may be greater than a length of the first electrode plate 110 and may be less than a length of a second electrode plate 120. However, in another embodiment, the separator 150 may extend further than the first and second electrode plates 110 and 120.

The first planarizing member 271 extends to cover all of the first electrode tab 113, the edge 110e of the first electrode plate 110, and the edge 150e of the separator 150, and accepts the stepped surface formed by them, so that the first planarizing member 271 may prevent an inner damage that is caused by facing another portion of the electrode assembly 100.

In more detail, the first planarizing member 271 may have a relatively flat surface, and its inner surface may be leveled to be complementary with a stepped surface of the electrode assembly 100. For example, the first planarizing member 271 may have a stepped form and may have accepting parts 271a, 271b, and 271c that accept the first electrode tab 113, the edge 110e of the first electrode plate 110, and the edge 150e of the separator 150, respectively, in a disposed order along a longitudinal direction of the electrode assembly 100. That is, the inner surface of the first planarizing member 271 may have the first electrode tab accepting part 271a, the first electrode plate edge accepting part 271b, and the separator edge accepting part 271c.

However, when required, the first electrode tab 113, the edge 110e of the first electrode plate 110, and the edge 150e of the separator 150 that form the stepped surface of the first end S1 may be individually covered by the first planarizing member 271, or may form different combinations and then may be covered by the first planarizing member 271. The first planarizing member 271 may have a seamlessly extending shape or two or more separated members so as to cover a selected part or the entire stepped surface.

The first planarizing member 271 is formed to have one of various embodiments so as to cover the selected part or the entire stepped surface, and this is because necessity of planarization may differ according to positions on the stepped surface. If the first planarizing member 271 decreases the inner damage by removing the stepped surface, the first planarizing member 271 may be formed to cover a particular area of the stepped surface or to completely cover the stepped surface.

A second planarizing member 272 may be formed on a second end S2 of the electrode assembly 100. The second planarizing member 272 may extend to cover all of a second electrode tab 123, an edge 150e of the separator 150, and an edge 110e of the first electrode plate 110 that form a stepped form. On the second end S2 of the electrode assembly 100, the length of the separator 150 may be greater than the length of the first electrode plate 110 and may be less than the length of the second electrode plate 120. However, in another embodiment, the separator 150 may extend further than the first and second electrode plates 110 and 120.

The second planarizing member 272 extends to cover all of the second electrode tab 123, the edge 150e of the separator 150, and the edge 110e of the first electrode plate 110, and accepts the stepped surface formed by them, so that the second planarizing member 272 may prevent an inner damage that is caused by facing another portion of the electrode assembly 100.

In more detail, the second planarizing member 272 may have a relatively flat surface, and its inner surface may be leveled to be complementary with a stepped surface of the electrode assembly 100. For example, the second planarizing member 272 may have a stepped form and may have accepting parts 272a, 272b, and 272c that accept the second electrode tab 123, the edge 150e of the separator 150, and the edge 110e of the first electrode plate 110, respectively, in a disposed order along the longitudinal direction of the electrode assembly 100. That is, the inner surface of the second planarizing member 272 may have the second electrode tab accepting part 272a, the separator edge accepting part 272b, and the first electrode plate edge accepting part 272c.

However, when required, the second electrode tab 123, the edge 150e of the separator 150, and the edge 110e of the first electrode plate 110 that form the stepped surface of the second end S2 may be individually covered by the second planarizing member 272, or may form different combinations and then may be covered by the second planarizing member 272. The second planarizing member 272 may have a seamlessly extending shape or two or more separated members so as to cover a selected part or the entire stepped surface.

Figure 13:
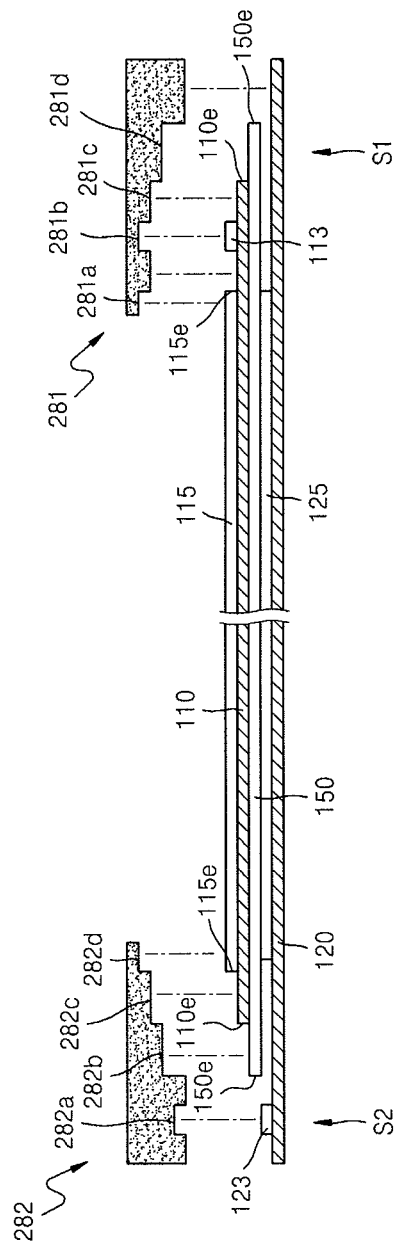
FIG. 13 is a cross-sectional view of a secondary battery according to another embodiment of the present invention.

FIG. 13 is a cross-sectional view of a secondary battery according to another embodiment of the present invention. Referring to FIG. 13, planarizing members 281 and 282 may include the first planarizing member 281 formed on a first end S1 of an electrode assembly 100 and may include the second planarizing member 282 formed on a second end S2 of the electrode assembly 100. The first and second planarizing members 281 and 282 may cover stepped surfaces formed on the first and second ends S1 and S2, respectively.

For example, the first planarizing member 281 may extend to cover all of an edge 115e of a first electrode active material 115, a first electrode tab 113, an edge 110e of a first electrode plate 110, and an edge 150e of a separator 150 that form a stepped surface.

In more detail, the first planarizing member 281 may have a relatively flat surface and its inner surface may be leveled to be complementary with the stepped surface of the electrode assembly 100. For example, the first planarizing member 281 may have a stepped form and may have accepting parts 281a, 281b, 281c, and 281d that accept the edge 115e of the first electrode active material 115, the first electrode tab 113, the edge 110e of the first electrode plate 110, and the edge 150e of the separator 150, respectively, in a disposed order along the longitudinal direction of the electrode assembly 100. That is, the inner surface of the first planarizing member 281 may have the first electrode active material edge accepting part 281a, the first electrode tab accepting part 281b, the first electrode plate edge accepting part 281c, and the separator edge accepting part 281d.

However, when required, the edge 115e of the first electrode active material 115, the first electrode tab 113, the edge 110e of the first electrode plate 110, and the edge 150e of the separator 150 that form the stepped surface of the first end S1 may be individually covered by the first planarizing member 281, or may form different combinations and then may be covered by the first planarizing member 281. The first planarizing member 281 may have a seamlessly extending shape or two or more separated members so as to cover a selected part or the entire stepped surface.

For example, a second planarizing member 282 may extend to cover all of a second electrode tab 123, an edge 150e of the separator 150, an edge 110e of the first electrode plate 110, and an edge 115e of the first electrode active material 115 that form a stepped surface.

In more detail, the second planarizing member 282 may have a relatively flat surface and its inner surface may be leveled to be complementary with the stepped surface of the electrode assembly 100. For example, the second planarizing member 282 may have a stepped form and may have accepting parts 282a, 282b, 282c, and 282d that accept the second electrode tab 123, the edge 150e of the separator 150, the edge 110e of the first electrode plate 110, and the edge 115e of the first electrode active material 115, respectively, in a disposed order along the longitudinal direction of the electrode assembly 100. That is, the inner surface of the second planarizing member 282 may have the second electrode tab accepting part 282a, the separator edge accepting part 282b, the first electrode plate edge accepting part 282c, and the first electrode active material edge accepting part 282d.

However, when required, the second electrode tab 123, the edge 150e of the separator 150, the edge 110e of the first electrode plate 110, and the edge 115e of the first electrode active material 115 that form the stepped surface of the second end S2 may be individually covered by the second planarizing member 282, or may form different combinations and then may be covered by the second planarizing member 282. The second planarizing member 282 may have a seamlessly extending shape or two or more separated members so as to cover a selected part or the entire stepped surface.

Figure 14:
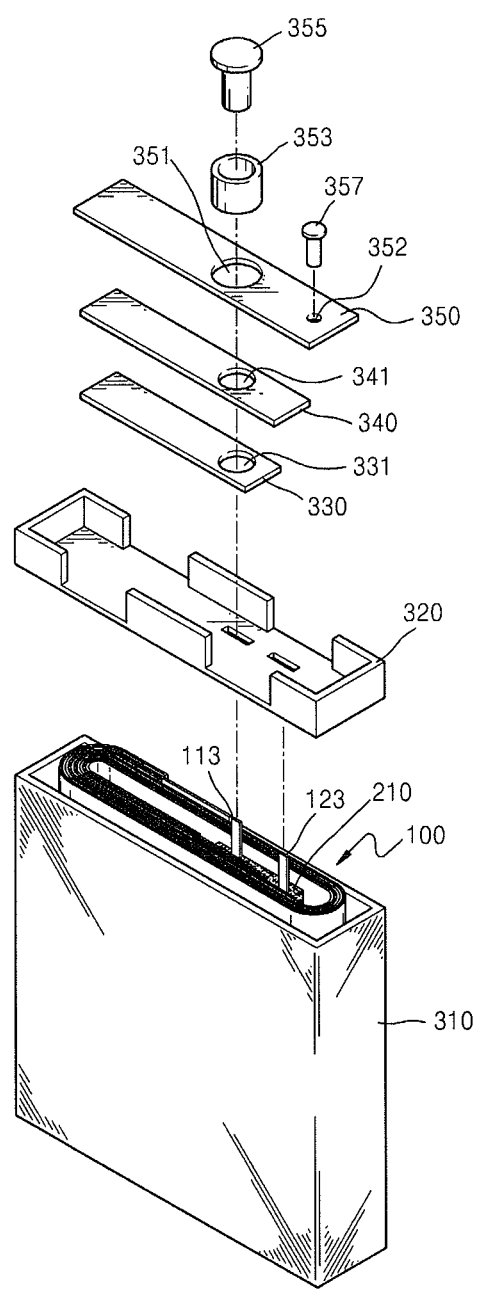
FIG. 14 is an exploded perspective view of a secondary battery according to another embodiment of the present invention.

FIG. 14 is an exploded perspective view of a secondary battery according to another embodiment of the present invention. Referring to FIG. 14, the electrode assembly 100 and the planarizing member 210 formed at an end of the electrode assembly 100 of FIG. 1 may be housed in a battery case 310, and an upper opening of the battery case 310 including the electrode assembly 100 may be sealed by a cap plate 350.

For example, an electrode terminal 355 to be electrically connected to the first electrode tab 113 may be assembled in the cap plate 350. The electrode terminal 355 may be assembled in a terminal hole 351 of the cap plate 350 while having an insulating gasket 353 interposed therebetween. The cap plate 350 may be electrically connected to the second electrode tab 123 that extends while penetrating an insulating case 320.

A terminal plate 330 that is electrically connected to the electrode terminal 355 may be disposed below the cap plate 350, and an insulating plate 340 may be interposed between the cap plate 350 and the terminal plate 330 so as to assure electrical insulation between them. For example, the electrode terminal 355 may be electrically connected to the first electrode tab 113 while penetrating through terminal holes 341 and 331 that are formed in the insulating plate 340 and the terminal plate 330, respectively. An electrolyte inlet 352 for injection of an electrolyte may be formed in the cap plate 350 and may be sealed by a sealing member 357.

The electrode assembly 100 and the planarizing member 210 formed on the end of the electrode assembly 100 may be housed in one of battery cases having various shapes and structures, and thus may not be housed in the battery case 310 of FIG. 14 but may be housed in a cylindrical-shape case or a flexible case such as a pouch case.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery comprising:
    an electrode assembly comprising a first electrode plate and a second electrode plate that each have planar surfaces whereon first and second electrode active materials are formed on the planar surfaces of first and second electrode plates respectively, and first and second electrode tabs are formed, respectively, and comprising a separator having an outer end disposed between and overlapping with the first and second electrode plates, and the second electrode plate while overlapping with the first electrode plate and the second electrode plate wherein the an outer end of the separator defines a first step with and one of the first or second electrodes plate define a step, and a second step with the second electrode plate; and
    at least one a planarizing member disposed on a first end of the at least one of first and second ends of the electrode assembly to support the first end of the electrode assembly, that are opposite each other on the first and second electrode plates electrode assembly, wherein the planarizing member comprises a stepped form that is complementary with a stepped surface exposed on the at least one of the first and second ends between the two electrode plates comprising at least the first and second steps, wherein the at least one planarizing member has:
        an inner surface that receives the stepped surface exposed on the at least one of the first and second ends between the two electrode plates comprising at least the first and second steps, so as to cover and planarize the stepped surface, wherein the inner surface comprises accepting parts for accepting one or more stepped forms among stepped forms of edges of the first and second electrode active materials, the first and second electrode tabs, edges of the first and second electrode plates, and an edge of the separator, and
        an outer surface of the at least one planarizing member member opposite the inner surface that receives the stepped surface of the first and second ends that is substantially planar and extends over substantially the entire at least one of first and second ends between the two electrode plates wherein the substantially planar outer surface extends parallel to the planar surfaces of the at least one of the first and second electrode plates,
    wherein the at least one planarizing member extends beyond the first and second steps formed by the outer end of the separator and one of the first or and second electrodes plates, and wherein the planarizing member consists of an insulating resin-based material that is coated and cured on the first end of the electrode assembly.

2. The secondary battery of claim 1, wherein planarizing member covers at least one of edges of the first and second electrode active materials, the first and second electrode tabs, edges of the first and second electrode plates, and an edge of the separator.

3. The secondary battery of claim 1, wherein the first and second electrode tabs are formed together on the end of the electrode assembly, and wherein the planarizing member extends to cover both the first and second electrode tabs.

4. The secondary battery of claim 3, wherein an edge of the first electrode plate that extends further than the first electrode tab, and an edge of the separator that extends further than the edge of the first electrode plate are formed between the first and second electrode tabs, and wherein the planarizing member extends to seamlessly cover all of the first and second electrode tabs, the edge of the first electrode plate, and the edge of the separator.

5. The secondary battery of claim 4, wherein, on the first end of the electrode assembly, a length of the separator is greater than a length of the first electrode plate and is less than a length of the second electrode plate.

6. The secondary battery of claim 5, wherein the first and second electrode plates have an uncoated portion that is not coated by the active material and wherein the planarization member covers the uncoated portion.

7. The secondary battery of claim 3, wherein the planarizing member extends while crossing the first electrode tab, thereby covering an edge of the first electrode active material.

8. The secondary battery of claim 1, wherein the inner surface of the planarizing member is contoured to define spaces that receives one or more protrusions from the electrode assembly and wherein the outer surface defines a smooth surface that when the electrode assembly is rolled together engages with the inner surfaces of the electrode assembly and reduces pressure exerted on the inner surfaces of the electrode assembly by the protrusions of the electrode assembly.

9. The secondary battery of claim 1, wherein the first and second electrode plates have an uncoated portion that is not coated by the first and second active materials and wherein the planarization member covers the uncoated portion.

10. The secondary battery of claim 1, wherein the planarization member covers the edges of the first electrode plate and the separator.

11. The secondary battery of claim 10, wherein the planarization member covers the edges of the first and second active materials and the first electrode plate.

12. The secondary battery of claim 1, wherein the first and second electrode tabs are formed on the first end and a second ends of the electrode assembly opposite from the first end, respectively.

13. The secondary battery of claim 12, wherein the electrode assembly is rolled in a shape of a roll by using the first end as a roll start and by using a second end opposite the first end as a roll end, and wherein the planarizing member is formed on the first end.

14. The secondary battery of claim 13, further comprising a second planarizing member formed on the second end.

* * * * *